Jan. 23, 1968  G. M. LEE  3,365,560
MANIPULATOR HANDLE ASSEMBLY WITH SWITCH MEANS
Filed March 16, 1964  3 Sheets-Sheet 2
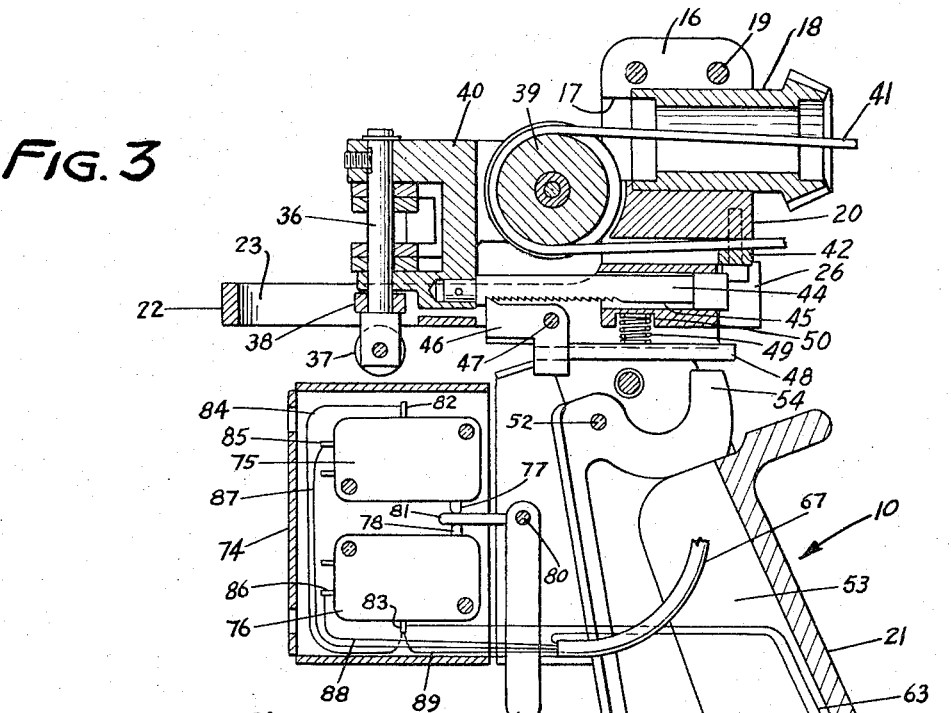
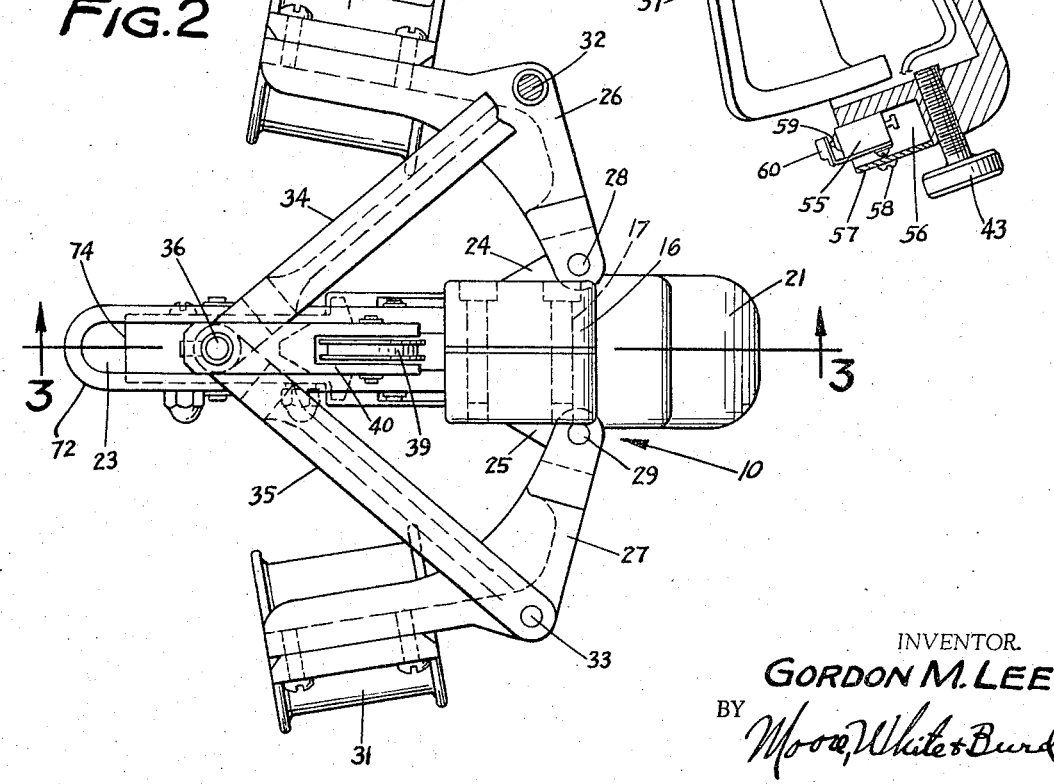
INVENTOR.
GORDON M. LEE
BY Moore, White & Burd
ATTORNEYS

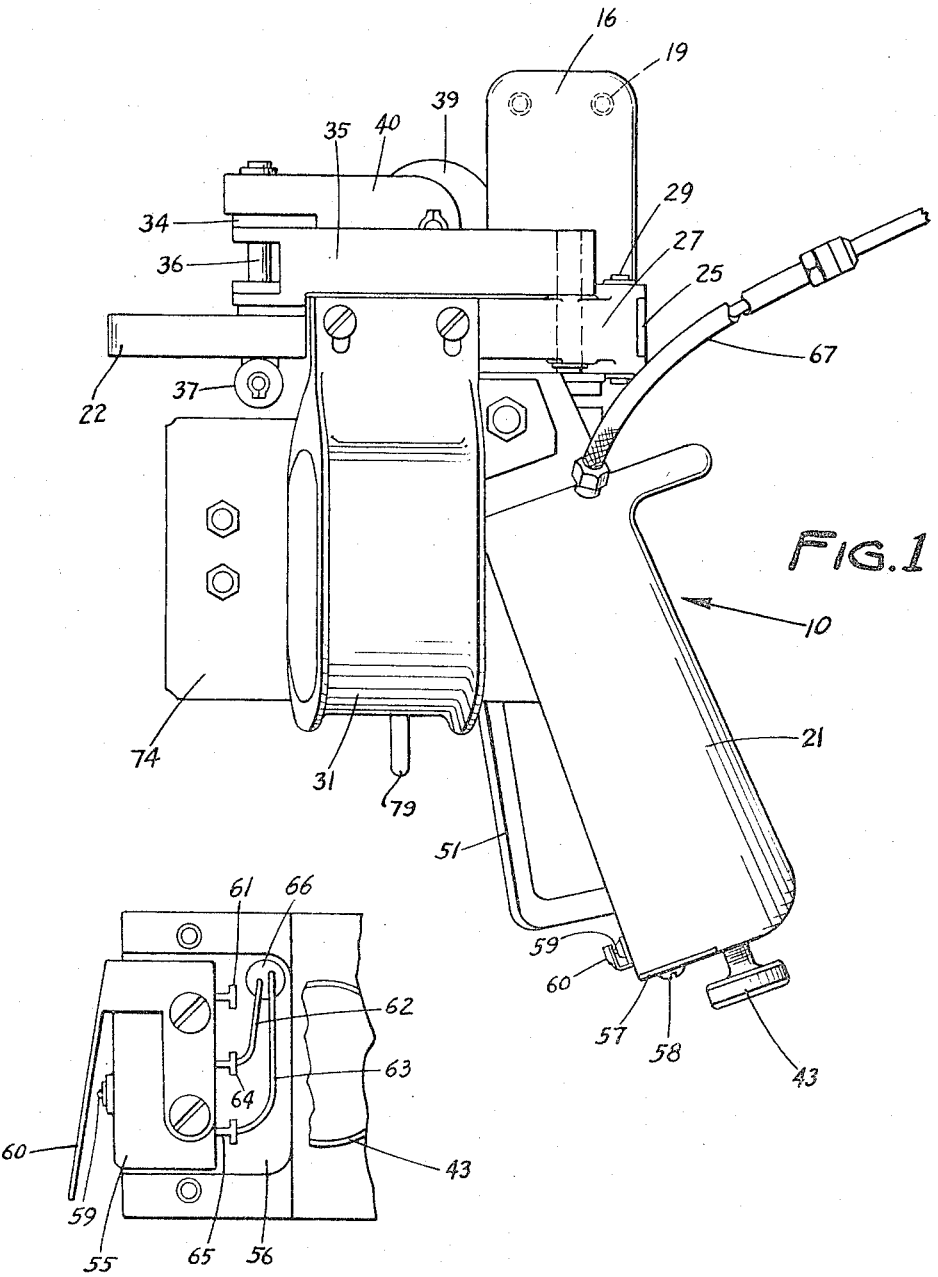

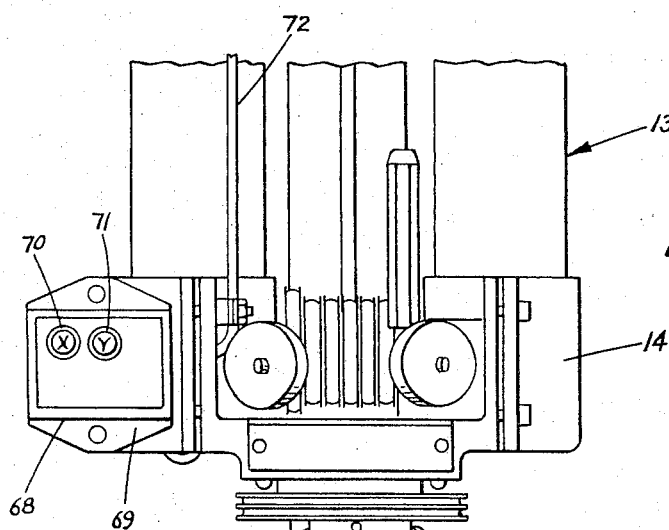
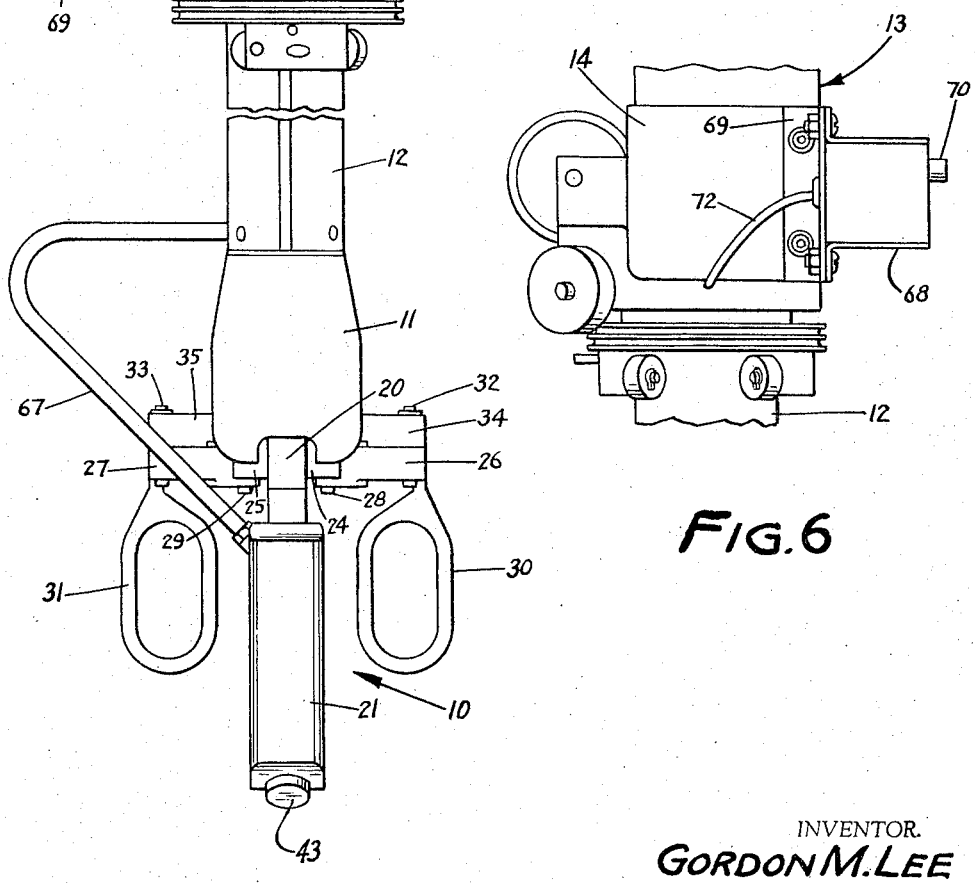

United States Patent Office 3,365,560
Patented Jan. 23, 1968

3,365,560
MANIPULATOR HANDLE ASSEMBLY WITH
SWITCH MEANS
Gordon M. Lee, Red Wing, Minn., assignor to Central
Research Laboratories, Inc., Red Wing, Minn., a corporation of Minnesota
Filed Mar. 16, 1964, Ser. No. 351,964
7 Claims. (Cl. 200—157)

This invention relates to a control handle assembly for use as part of a remote-control master-slave manipulator of the general type exemplified by United States Patent No. 2,888,154 of Jelatis et al. Such manipulators are used by an operator to perform certain manipulative functions in some remote area as, for example, on the opposite side of a shielding wall.

As shown in the aforesaid patent, it is known to increase the range of maneuverability and usefulness of such a manipulator by extending its lateral reach or X motion. This is accomplished by means of a lateral rotation or side canting arrangement, as described in that patent, by means of which the master and slave arm of the manipulator may be laterally displaced with respect to each other. While this lateral displacement may be accomplished manually with appropriate manual jack means, it is more usual to utilize an electrically operated mechanical assist to accomplish the lateral displacement. Such mechanical assist means commonly take the form of an electrically driven screw jack or motor driven gear train. The control switch for actuating the mechanical assist means is commonly mounted on the lower end of the master arm trunk tube assembly within easy reach of the operator.

As shown in the same aforesaid patent, but explained in greater detail in United States Patent No. 2,771,199 of Jelatis, it is also known to extend the slave arm of the manipulator angularly forward with respect to the master arm. This extended Y motion may also be accomplished manually but it is common practice to utilize a mechanical assist, usually electrically driven. The control switch for such electrically driven mechanical assist means for the Y motion is also commonly mounted on the lower end of the master arm trunk tube assembly within easy reach of the manipulator operator.

One principal disadvantage of the prior practice is that it makes operation of the manipulator with the mechanical assist means essentially a two-handed operation. One hand is required to manipulate the control handle and another to operate the electrical switches. Since remote-control manipulators are ordinarily installed in pairs in order to reproduce the manipulative action of a pair of human hands on the opposite side of a barrier wall, the usefulness of such manipulators is seriously curtailed if the operator must release the handle assembly of one master arm in order to actuate the switch means controlling the mechanical assist of the other arm.

It is the principal object of the present invention, therefore, to provide a handle assembly for remote-control master-slave manipulators incorporating selective switch means in the handles within the immediate one-hand control of the manipulator operator.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a left side elevation, from the view point of the operator, of the handle assembly according to the present invention;

FIGURE 2 is a top plan view of the handle assembly;

FIGURE 3 is a vertical section showing details of construction of the handle assembly and its means of attachment to the wrist joint of a master arm assembly;

FIGURE 4 is an enlarged fragmentary bottom view of the pistol grip portion of the handle assembly shown with a cover plate removed to reveal interior construction;

FIGURE 5 is a rear elevation of the handle assembly according to the present invention, i.e. as faced by the operator, shown in place on the master arm of a manipulator; and FIGURE 6 is a side elevation of the bottom end of the manipulator master arm trunk tube assembly showing mounting of a pilot light assembly.

Referring now to the drawings, the handle assembly is indicated generally at 10. As shown in FIGURE 5, the handle assembly is connected to a wrist joint 11 of a master arm assembly at the bottom end of an elongated boom tube 12 which is movable longitudinally relative to a trunk tube assembly indicated generally at 13 and including an azimuth bracket 14 which comprises part of the lower end of the trunk tube assembly. As is well understood in the art, the boom tube 12 extends through the azimuth bracket 14 in an operational relationship such that certain of the movements of the handle assembly are imparted through the azimuth assembly directly or through mechanical linkages to complementary parts of a long tong means comprising part of a salve arm on the opposite side of a barrier wall. As is also understood in the art, other movements of the handle assembly are imparted through mechanical linkages through the master arm boom tube to the grasper or tong means independent of the azimuth bracket and assembly. Since the manner in which the manipulative movements of the handle assembly are reproduced in the grasper or tong means are well known, and per se form no part of the present invention, the present disclosure is not burdened by needless illustrations and explanations of such means.

The handle 10 includes a fitting 16 provided with a bore 17 into which the end of tubular bevel gear 18 (FIGURE 3), which comprises part of the wrist joint, is inserted. Suitable screws 19 or equivalent fastening means are provided to firmly secure the handle to the bevel gear 18 of the wrist joint. Fitting 16 is provided with an integral extension 20 to which a pistol grip palm rest 21 is attached. The extension 20 of fitting 16 has a forwardly extending track or frame member 22. The track member 22 is a channel member having an elongated slot 23.

The central extension 20 is provided with a pair of ears 24 and 25 (FIGURE 2) which extend in generally opposite directions and provide pivotal support for the end of levers 26 and 27, at 28 and 29, respectively. Each lever is composed of angularly related portions in the form of a bent arm so that the levers may extend in generally opposite directions from their pivots 28 and 29 and then in generally parallel relation. Finger or thumb grips 30 and 31 are disposed at the extremities of the levers 26 and 27, respectively. Which grip functions as a finger grip or a thumb grip will, of course, depend upon whether the handle is intended for right hand or left hand operation. When the hand is placed with the palm against the back edge of the palm rest 21, the thumb engages one of the grip members 30 or 31 and one or more of the fingers engage the other grip.

At the junctures of the angularly related portions of the levers 26 and 27, that is, at the elbows of the bent arms, there are pivots 32 and 33, respectively, for the outer ends of links 34 and 35, respectively. The inner ends of the links are connected in a common pivot formed by a pin 36 which extends through the slot 23 in the track member 22. The inner ends of the links 34 and 35 are bifurcated and intermeshed. The pin 36 serves as a slidable anchor for the links 34 and 35 in the track 22. For this purpose the pin 36 is provided at its lower extremity with a pair of rollers 37 which are spaced apart and generally parallel to the longitudinal axis of pin 36 and ride on the outside of the base of the track 22 and a transverse roller 38 which rides in and engages the slot 23.

A pulley 39 positioned generally in the central vertical plane of the handle assembly and displaced above the track 22 is mounted in one bifurcated extremity of a support 40. Support 40 is doubly bifurcated. The arms embracing pulley 39, being spaced generally horizontally and having vertically spaced arms straddling the bifurcated ends of the levers 34 and 35 and engaging pin 36. A cable 41 (FIGURE 3) that enters the handle through the bore 17 of fitting 16 from the bevel gear 18 of the master arm wrist joint extends over the pulley and is anchored by means of a clamp 42 lodged within an aperture in the fitting extension portion 20.

The cable 41 extends through the manipulator to the gripper or tong member at the end of the slave arm to control the squeeze thereof as is well understood in the art. When the grips 30 and 31 are squeezed together the action of links 34 and 35 causes the pin 36 and the support 40 and pulley 39 to be moved forward (that is, away from the operator, and toward the left as viewed in FIGURES 1, 2 and 3) being guided along the slot 23. This motion causes the pulley 39 to draw the cable 41 forward to put tension on the cable, the result of which is to close the jaws of the tongs or gripper means at the other end of the manipulator.

As shown in FIGURE 3, in order to permit the tension on cable 41 to be maintained, a locking means is provided. This locking means includes a rearwardly extending elongated toothed ratchet bar 44 which extends from the pulley support 40 in the same direction as but below pulley 39. The opposite end of ratchet bar 44 is guided in a slot or aperture 45 in the extension 20 of fitting 16. A pawl 46 is pivoted at 47 in the track frame 22 for engagement with the teeth of ratchet bar 44. In order to provide automatic locking, pawl 46 is provided with a rearwardly extending arm 48 which is engaged by compression spring 49 seated in a recess 50 in the bottom of the extension 20 of fitting 16. Spring 49 normally bears against arm 48 to maintain pawl 46 in engagement with the teeth of ratchet bar 44.

Trigger-like release means are provided for unlatching pawl 46 from ratchet 44. The trigger means 51 is pivoted at 52 in the pistol grip palm rest of the handle assembly guided in a recess 53 in the palm rest. When the trigger means 51 is squeezed with slight finger pressure it moves on its pivot and the unlatching sear portion 54 bears against the end of pawl arm 48 against the pressure of spring 49 to tilt pawl 46 on its pivot 47 out of engagement with ratchet 44. Pulley support 40 and pulley 39 are then returned to their normal at rest position by tension exerted on cable 41 through the manipulator.

Movement of trigger means 51 may be limited by means of screw 43 which, when extending into the recess 53, functions as a stop to prevent accidental disengagement of the pawl and ratchet and release of tension on the tong cable.

A selector switch 55 is located in a recess 56 at the bottom end of the pistol grip palm rest 21. Recess 56 is normally closed by means of a cover plate 57 secured by screws 58 or equivalent fastening means. FIGURE 4 shows an enlarged detail of the selector switch with the cover plate 57 removed.

Selector switch 55 is a miniature snap-action single pole double throw switch ("Micro Switch" 11SM1-T) whose plunger 59 when depressed by the leaf spring actuator 60 causes a common contact to snap at a very high speed from a normally closed to a normally open contact. As pressure is released on the actuator the common contact snaps back to the normally closed position.

Selector switch 55 is used to operate a stepper relay. For this use, the normally closed terminal 61 is not required. Conductors 62 and 63 from the normally open contact terminal 64 and common contact terminal 65, respectively, extend through an aperture 66 into the recess of the pistol grip and ultimately through a flexible conduit 67 to the stepper relay.

The control circuitry, as such, forms no part of the present invention. As is known, a stepper relay operates to make sequential connection with each of several different circuits. In the case of a remote control manipulator these circuits may be the circuits for operation of the X motion actuator, the circuit for operation of the Y motion actuator and "off," in sequence. A greater number of circuits may be connected in sequence as necessary or desired, for example, a circuit controlling an extended Z motion actuator.

The leaf spring selector switch actuator 60 is so positioned on the bottom end of the forward edge of the pistol grip of the control handle assembly as to be easily operated by the pressure of the small finger of either hand. The stepper relay circuit is normally in "off" position. If the operator desires to operate one of the actuator circuits, in order to actuate one of the electrically-driven mechanical assists to one of the manipulator motions, he merely depresses the leaf spring selector switch actuator and releases it the required number of times until the desired circuit is connected. When the series is run through in sequence the relay returns to its "off" position and the sequence is ready to be repeated.

In order that the operator may be apprised of the circuit connected at any given time, a pilot light assembly is desirably provided. For this purpose, a lamp box 68 is mounted within easy view of the operator, for example, by means of a suitable bracket 69 on the master azimuth assembly 14 at the lower end of the master arm. The face plate of the lamp box is provided with apertures as necessary into each of which is inserted a transparent or translucent cap or lens in front of a light bulb. For example, cap 70 may be white and when lighted may signal connection of the X motion actuator circuit, and cap 71 may be red and when lighted indicate connection of the Y motion actuator, and so on. The pilot light assembly is electrically connected to the circuit by wires as necessary as for example cable 72.

Each of the electrically-driven mechanical assist means of the manipulator must be capable of operation in two directions. For example, in X motion the actuator must be capable of moving the slave arm both to the right and to the left as desired and necessary; in Y motion, forward and backward; and in Z motion extend and retract. For this reason, in addition to selector switch means, additional switch means are provided for directional movement.

A housing 74 is mounted under the track frame 22 and forward of the pistol grip palm rest 21. A pair of miniature snap-action single pole double throw switches 75 and 76 ("Micro Switch" V3-15) are mounted within the housing 74 with their plungers 77 and 78, respectively, in closely spaced apart facing relationship, as shown in FIGURE 3.

A switch actuator trigger member 79 is pivotally mounted at 80 and provided with a forwardly extending arm 81 which rests between the swtich plungers 77 and 78. When trigger actuator 79 is moved rearwardly by finger pressure, switch 76 is actuated and, when trigger actuator 79 is moved forwardly by finger pressure, switch 75 is actuated. Switch 75 controls the circuits for causing the mechanical assist actuators of the manipulator to operate in one direction and switch 76 controls the circuits to cause those mechanical assist actuators to move in the opposite direction.

The common contact terminals 82 and 83 of the respective switches are connected together by wire 84. The common contact terminals 65 of the selector switch 55 and 83 of switch 76 are interconnected by wire 63. The normally open contact terminals 85 and 86 of switches 75 and 76, respectively, and common contact terminal 83 of switch 76 are each connected by means of electrical connectors 87, 88 and 89, respectively, through flexible conduit 67 to the operating circuits of the electrically driven actuators whose operation the switches control.

The handle assembly according to the present invention permits a manipulator operator to perform one-handedly a full range of manipulator motions. With his thumb and index finger he can engage grips 30 and 31 to control the gripping action of the tong means on the slave arm. With his thumb and index finger engaging the grips and his palm engaging the pistol grip palm rest he can perform the usual and elevation and twist motions. With his ring finger on trigger member 51 he can release the pawl and ratchet means maintaining tension on the tong cable. With his small finger he can sequentially select which of the electrically-driven mechanical assist means needed to extend his range of operation. With his middle finger he can control the direction of movement of the electrically-driven mechanical assist means.

Although the handle assembly according to the present invention has been described and illustrated with particular reference to conventional master-slave manipulator of the general type exemplified by the aforesaid patents, it is equally adapted to use as part of a so-called heavy-duty master-slave manipulator as exemplified by application for United States Letters Patent of Jelatis et al., Ser. No. 158,396, filed Dec. 11, 1961, now U.S. Patent No. 3,139,990 or as part of a sealed master-slave manipulator exemplified by application for United States Letters Patent of Jelatis et al., Ser. No. 98,372, filed Mar. 27, 1961, now U.S. Patent No. 3,164,267.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A handle assembly for a remote-control master-slave manipulator having electrically-driven mechanical assist means for at least one of its motions, said assembly comprising fitting means for attachment of a handle to the master arm of a manipulator, palm rest means attached to said fitting means. means engageable by thumb and finger for movement of said handle in cooperation of said palm rest means and for movement of mechanical tension applying means for operation of tong means on the slave arm of the manipulator, selector switch means mounted in said assembly, said selector switch means having an actuator engageable by one finger to be actuated by finger pressure to close a switching circuit, said actuator being disposed on the forward surface of said palm rest means opposite from the rearwardly facing palm engaging surface thereof, and dual operating directional switch means mounted in said assembly, said directional switch means having a trigger actuator, said trigger actuator lying between said means engageable by thumb and finger for movement of the handle, forward of said palm rest means and engageable by one finger said trigger actuator normally being in an intermediate "off" position and moveable in two directions by finger pressure to close either of two switching circuits.

2. A manipulator handle assembly according to claim 1 further characterized in that said palm rest means is in the form of a pistol grip, said means engageable by thumb and finger include a pair of spaced apart grips depending from pivotally mounted bent arms and disposed forward of said pistol grip and said switch actuators lie between the thumb and finger grips and palm rest in the normal paths of movement of the middle, ring and small fingers when the assembly is grasped by a human hand.

3. A manipulator handle assembly according to claim 1 further characterized in that said directional switch means includes a pair of snap-action plunger operated on-off switches disposed with their plungers in spaced apart face-to-face relation, said trigger actuator includes a pivotally mounted trigger member having an angularly extending arm, said arm being disposed between said switch plungers, whereby movement of said trigger member in one direction actuates one of said switches and movement of said trigger member in the opposite direction actuates the other of said switches.

4. A handle assembly for a remote-control master-slave manipulator having electrically-driven mechanical assist means for at least one of its motions, said handle assembly comprising fitting means for attachment of the handle assembly to the master arm of the manipulator, palm rest means secured to the fitting means usable for movement of said handle assembly, a pair of spaced apart thumb and finger grips disposed forward and on opposite sides of the palm rest means for operation of mechanical tension applying means controlling tong means on the slave arm. a first switch means mounted in said assembly, said first switch means having an actuator engageable by one finger and actuated by finger pressure to close a switching circuit, and second switch means mounted in said assembly between the thumb and finger grip and palm rest means in the normal path of movement of the middle, ring and small fingers when the palm rest means is grasped by a human hand, said second switch means having a trigger actuator engageable by one finger, said trigger actuator normally being in an intermediate "off" position and movable by finger pressure to close another switching circuit.

5. A manipulator handle assembly according to claim 4 further characterized in that said second switch means includes a pair of snap-action plunger operated on-off switches disposed with their plungers in spaced apart face-to-face relation, said trigger actuator includes a pivotally mounted trigger member having an angularly extending arm, said arm being disposed between said switch plungers, whereby movement of said trigger member in one direction actuates one of said switches and movement of said trigger member in the opposite direction actuates the other of said switches.

6. In combination, a mechanical remote control master-slave manipulator having a master arm, a slave arm directly controlled by the master arm, said slave arm including electrically-driven mechanical assist means for at least one of its motions, tong means, and tension applying means for the tong means, a switching circuit coupled to said electrically-driven mechanical assist means, a handle assembly attached to the master arm, said handle assembly comprising fitting means for attachment of the handle assembly to the master arm, palm rest means secured to and projected downwardly from the fitting means, means engageable by fingers disposed on opposite sides of the palm rest means for operation of said tong means, first switch means mounted in the lower forward portion of the palm rest means, said first switch having a control member actuated by finger pressure to selectively close said switching circuit for the electrical-driven mechanical assist means, and second switch means mounted in said handle assembly forwardly of the palm rest means, said second switch means having a trigger actuator engageable by one finger for opposite movements to "on" positions selectively coupling the electrically-driven mechanical assist means to a source of electric power.

7. In combination, a mechanical remote control master-slave manipulator having a master arm, a slave arm directly controlled by the master arm, said slave arm including a plurality of electrically-driven mechanical assist means for at least two of its motions, a switching circuit coupled to said electrically driven mechanical assist means, tong means, and tension applying means for the tong means, a handle assembly attached to the master arm, said handle assembly comprising fitting means for attachment of the handle assembly to the master arm, palm rest means secured to and projected downwardly from the fitting means, means engageable by fingers disposed on opposite sides of the palm rest means for operation of said tong means, first switch means mounted in the lower forward portion of the palm rest means, said first switch means having a control member actuated by finger pressure to selectively close said switching circuit to electrically couple one of the electrically-driven mechanical assist means, and a second switch means mounted in said handle assembly forwardly of the palm rest means, said second switch means having a pair of snap-action plunger operated on-off switches disposed with their plungers in spaced apart face-to-face relation and a trigger member having an angularly extended arm disposed between said switch plungers whereby movement of said trigger member in one direction actuates one of said switches and movement of the trigger member in the opposite direction actuates the other of said switches to selectively connect the electrically-driven mechanical assist means electrically coupled in the switching circuit by the first switch means to a source of electric power.

References Cited
UNITED STATES PATENTS

| | | | |
|---|---|---|---|
| 2,861,699 | 11/1958 | Youmans | 214—1 |
| 2,985,740 | 5/1961 | Fisher et al. | 200—157 |
| 3,146,634 | 9/1964 | Saunders. | |
| 2,801,308 | 7/1957 | Cubellis | 200—153 |
| 2,851,899 | 9/1958 | Ingres | 74—471 X |
| 3,115,555 | 12/1963 | Lescarboura | 200—153 |

ROBERT K. SCHAEFER, *Primary Examiner.*

D. SMITH, JR., *Assistant Examiner.*